(12) United States Patent
Cheung et al.

(10) Patent No.: US 9,763,469 B2
(45) Date of Patent: Sep. 19, 2017

(54) JUICER

(71) Applicant: Huiyang Allan Plastic & Electric Industries co., Limited, Huizhou (CN)

(72) Inventors: Shu Sang Cheung, Hong Kong (HK); To Yin Pang, Hong Kong (HK)

( * ) Notice: Subject to any disclaimer, the term of this patent is extended or adjusted under 35 U.S.C. 154(b) by 656 days.

(21) Appl. No.: 14/324,157

(22) Filed: Jul. 5, 2014

(65) Prior Publication Data

US 2015/0090130 A1   Apr. 2, 2015

(30) Foreign Application Priority Data

Sep. 27, 2013   (CN) .................. 2013 2 0600664 U

(51) Int. Cl.
*A47J 19/02* (2006.01)
*A23N 1/00* (2006.01)
*A23N 1/02* (2006.01)

(52) U.S. Cl.
CPC .............. *A23N 1/02* (2013.01); *A47J 19/027* (2013.01)

(58) Field of Classification Search
CPC . A23N 1/02; A23N 1/003; A23N 1/00; A23N 4/04; A23N 4/14; A47J 19/027; A47J 19/02; A47J 19/022
USPC .................................. 99/501–513, 491, 486
See application file for complete search history.

(56) References Cited

U.S. PATENT DOCUMENTS

| | | | | |
|---|---|---|---|---|
| 2,552,572 A | * | 5/1951 | Mikina | A47J 19/02 210/359 |
| 3,566,939 A | * | 3/1971 | Hubrich | B27L 1/127 99/501 |
| 4,534,108 A | * | 8/1985 | Yamamoto | A47J 19/02 30/123 |
| 4,688,478 A | * | 8/1987 | Williams | A47J 43/06 241/282.1 |
| 2006/0065133 A1 | * | 3/2006 | Moline | A47J 19/027 99/511 |
| 2007/0125244 A1 | * | 6/2007 | Hensel | A47J 19/025 99/501 |
| 2008/0314261 A1 | * | 12/2008 | Hensel | A47J 37/0835 99/511 |
| 2009/0235831 A1 | * | 9/2009 | Nisonov | A47J 19/02 100/112 |
| 2009/0272280 A1 | * | 11/2009 | Cheung | A23N 1/02 99/513 |
| 2010/0058939 A1 | * | 3/2010 | Rivera | A47J 19/02 99/501 |
| 2010/0058940 A1 | * | 3/2010 | Rivera | A47J 19/02 99/501 |
| 2010/0058941 A1 | * | 3/2010 | Rivera | A47J 19/02 99/513 |

(Continued)

*Primary Examiner* — Michael Laflame, Jr.
(74) *Attorney, Agent, or Firm* — Prakash Nama; Global IP Services, PLLC

(57) ABSTRACT

The invention discloses a juicer, includes a base, a motor assembly, a cutter disk, a collar and an elevator assembly. The elevator assembly is configured for lifting up or lowering down the collar in accordance to user's operations, as a result a distance between the collar and the cutter disk is adjusted and the area of each filter hole that being covered or sealed by the collar is adjusted. The present invention can realize changing the size of filter holes, to control fiber flow through. Thus pure juice and different content of insoluble dietary fiber vegetables and fruits juice can be obtained.

6 Claims, 5 Drawing Sheets

(56) References Cited

U.S. PATENT DOCUMENTS

2010/0300307 A1\* 12/2010 Huang ................. A47J 19/027
99/511
2012/0103203 A1\* 5/2012 Hensel ................ A47J 43/0761
99/504

\* cited by examiner

JUICER

BACKGROUND OF THE INVENTION

1. Field of the Invention

The present embodiments relate to a juicer, especially to a juicer for producing juice with controllable amount of insoluble dietary fiber content

2. Description of Related Art

Modern people increasingly pay attention to healthy diet and nutrition, especially pay attention to fruits and vegetables, but after squeeze and filter the clear fruit juice or vegetable juice may have low nutritive value, because most dietary fiber and protein in fruits and vegetables are lost. Research has proved that cloudy juice and fruit gravy have insoluble dietary fiber and insoluble element such as calcium, insoluble dietary fiber can avoid gastrointestinal diseases, has function of stimulating intestinal peristalsis and promoting defecation.

At present, juicer have two forms, one kind of juicer have pulp discharge structure, can achieve clear liquid after filtering. The motor of juicer drives cutter disk rotating in high-speed, pushing fruits and vegetables from feed inlet to cutter disk, spikes of cutter disk cut up the fruits and vegetables. As the cutter disk generates centrifugal force in high speed, pulp of fruits and vegetables fly off the metal foil filter mesh into the pulp container, while fruits and vegetables juice pass through the metal foil filter mesh flow into juice glass, so as to make effective separation between pulp and juice. For example the patent number of ZL201220010057.6 which discloses a pulp discharge structure of juicer, only can achieves pure fruit and vegetable juice, nutriment in pulp is lost, especially for cellulose. The other kind of juicer don't have similar pulp discharge structure, after squeezing and smashing the fruits and vegetables can achieve compound of pulp and juice, but the amount of pulp can affect the whole taste of fruits and vegetables juice.

BRIEF SUMMARY OF THE INVENTION

To solve the above mentioned technical problems, the present invention provides a juicer capable of producing juice with controllable amount of insoluble dietary fiber content.

A juicer includes a base, a motor assembly, a cutter disk, a collar and an elevator assembly. The base defines a slot in its side wall. The motor assembly is fixed in the base. The cutter disk is connected to and driven by the motor assembly. A flange extends from the outer perimeter of the cutter disk and defines a plurality of filter holes which act as outlets for the pulp of the fruits and vegetables processed. A metal foil filter mesh extends from the end of the flange. The collar is configured under the flange. The elevator assembly is configured for lifting up or lowering down the collar according to user's operations, as a result a distance between the collar and the cutter disk is adjusted and the area of each filter hole that being covered or sealed by the collar is adjusted.

Preferably, the elevator assembly includes a deflector rod, a first external gear, a fixing bracket, and a second external gear. The deflector rod includes a first end protruding out the case through the slot and a second end locked in the base. The deflector rod defines a fixing hole near its middle part. A supporting shaft extends upwardly from the deflector rod and is arranged between the fixing hole and the first end. The first external gear includes a post extending downwardly from a lower surface of the first external gear. The post inserts in the fixing hole of the deflector rod. The fixing bracket is fixed to the motor assembly, the fixing bracket includes a column protruding upwardly from its upper surface and defines a groove in its lower surface. The column has external screw thread arranged at its outside wall, the supporting shaft is partly received in the groove and capable of moving along the groove. The second external gear engages with the first external gear and includes an internal screw thread which meshes with the external screw thread of the column.

Preferably, the column of the fixing bracket defines external screw thread at its outside wall, the second external gear is hollow and has internal screw thread in its inner side wall, the internal screw thread matches with the external screw thread, thus that the second external gear is capable of moving up and down with respect to the fixing bracket.

Preferably, a cap is configured at the first end of the deflector rod in order to facilitate operation.

Preferably, a bearing is connected to the second gear from the upper end of the second gear and can rotate along the second gear, the collar is connected to the bearing and can rotate freely with respect to the bearing.

Preferably, the cutter disk is connected to the motor assembly via a clutch.

Depending on the elevator assembly, the collar can move up and down, thereby an effective size of filter holes is adjustable, a fiber flow is controllable. The present invention has the following effects: 1) the juicer can produce pure juice and juice with different content of insoluble dietary fiber of vegetables and fruits, insoluble dietary fiber and insoluble element like calcium are beneficial for people health. 2) When the juicer is operating, by moving the deflector rod to adjust the effective size of the filter holes, thereby controlling fiber flow outflow from the filter holes, without stopping the motor, adjust quickly, practical and convenient. 3) According to different filter food and taste and healthy need, aim at adjusting the size of filter holes, obtaining ideal effect of filter juice and quality.

BRIEF DESCRIPTION OF THE SEVERAL VIEWS OF THE DRAWING(S)

DETAILED DESCRIPTION OF THE INVENTION

The present invention is further described in detail with the reference of the attached drawings and the specific embodiments.

Figure 1:
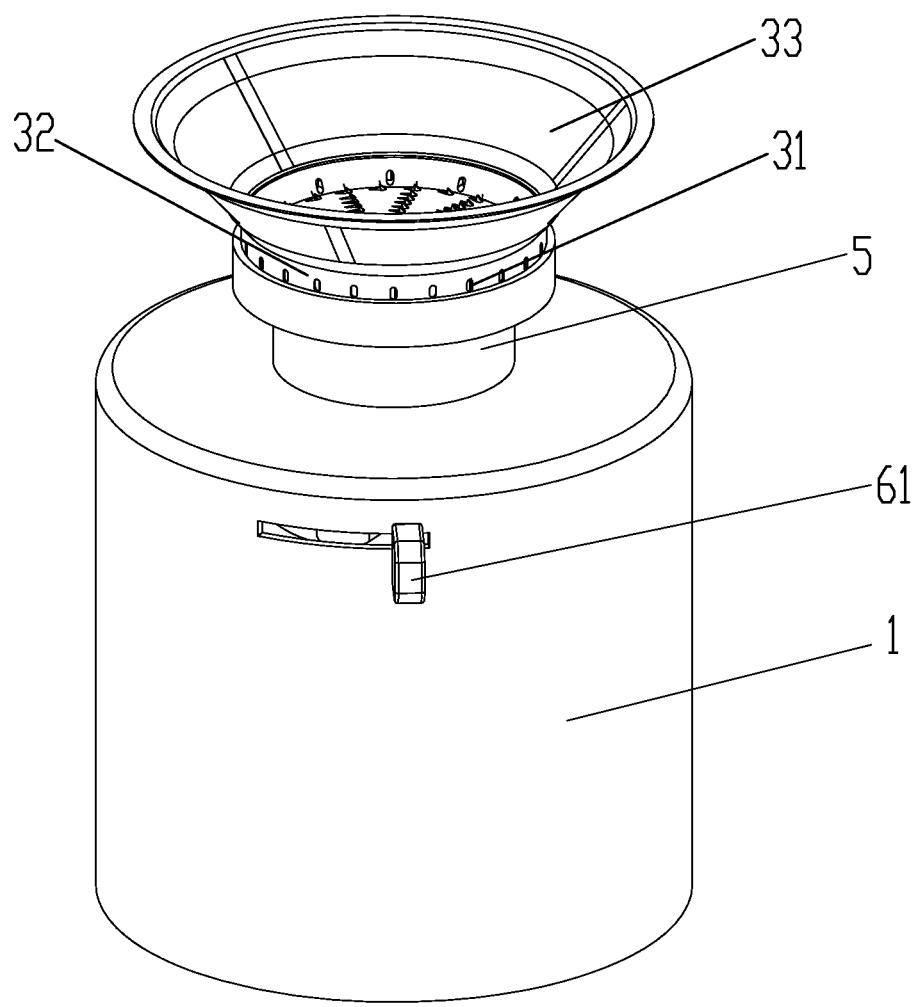
FIG. 1 is a perspective view of a juicer in accordance to an exemplary embodiment of the present invention.
Figure 2:
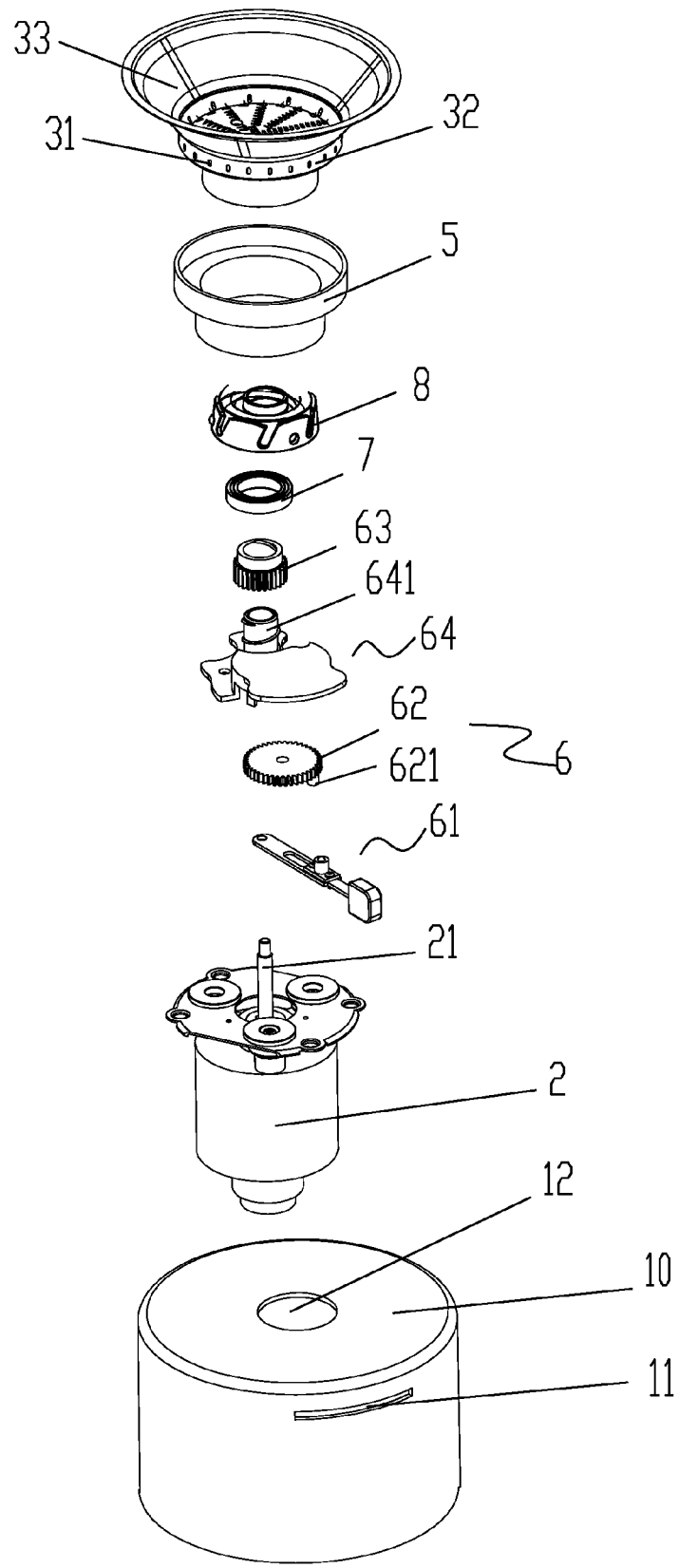
FIG. 2 is an exploded view of the juicer in FIG. 1.
Figure 3:
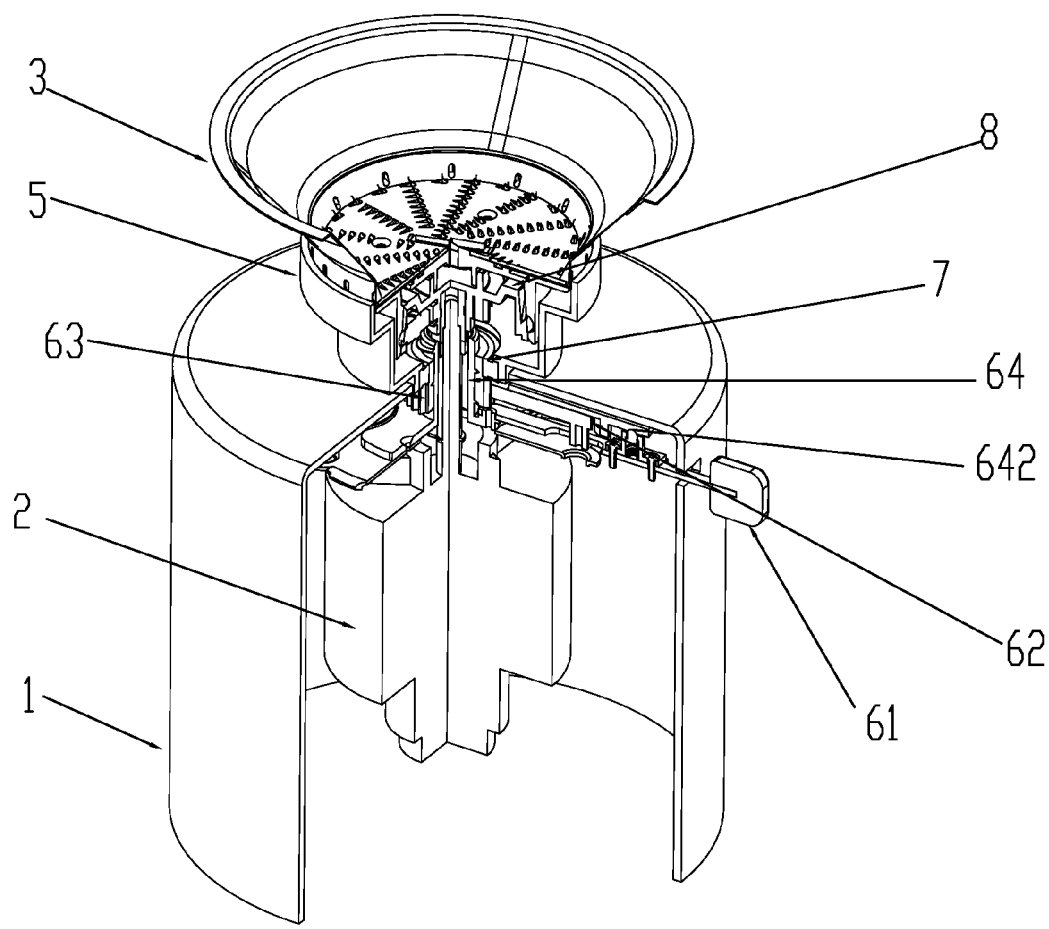
FIG. 3 is a cut away view of the juicer in FIG. 1.
Figure 4:
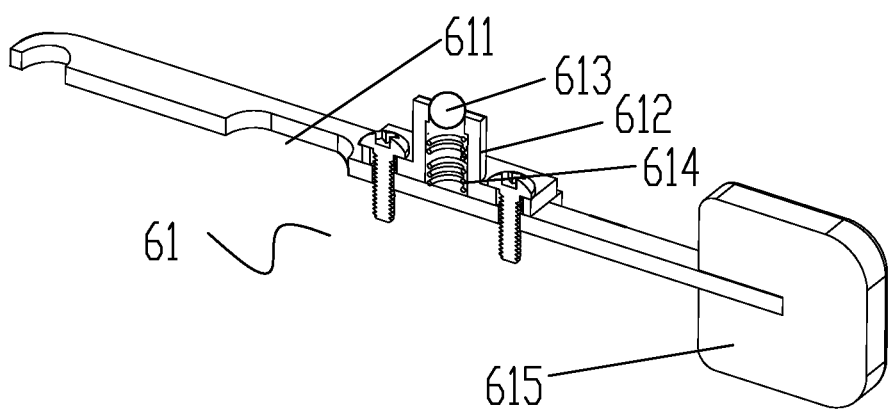
FIG. 4 is a cut away view of a deflector rod of the juicer in FIG. 1.
Figure 5:
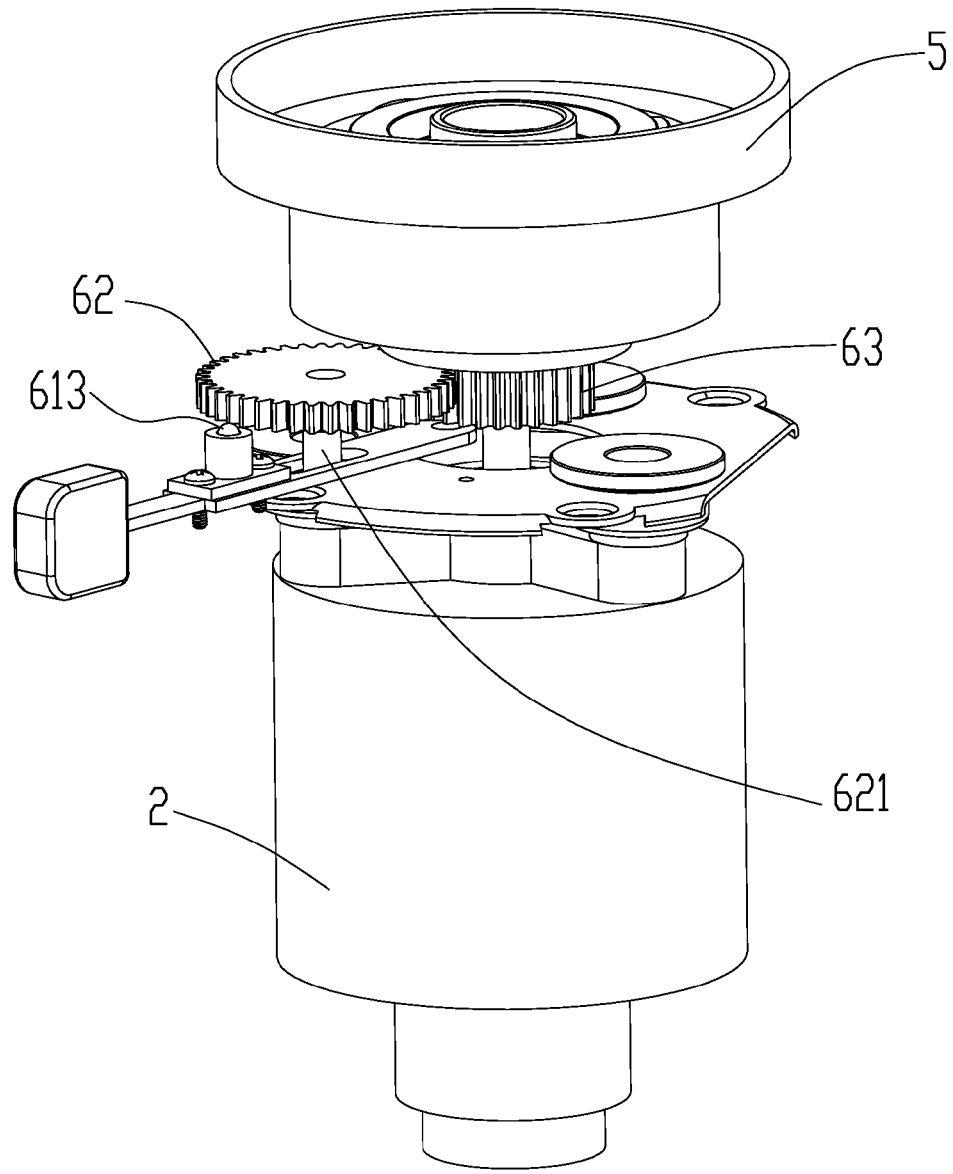
FIG. 5 is an assembly view showing a motor assembly, an elevator assembly and a collar 5 of the juicer in FIG. 1.

As shown in FIG. 1 to FIG. 3, a centrifugal juicer capable of producing juice with controllable amount of insoluble dietary fiber content in accordance to an embodiment of the present invention mainly includes a base 1, a motor assembly 2 fixed in the base 1, a cutter disk 3 driven by the motor assembly 2 via a clutch 8, a collar 5 configured under the cutter disk 3, and an elevator assembly 6 configured for adjusting the distance between the collar 5 and the cutter disk 3.

The base 1 includes a case 10 defining a through hole 12 in its upper surface and a slot 11 in its side wall. The motor assembly 2 is fixed in the case and its motor shaft 21 protrudes out through the through hole 12. The clutch 8 is fixed to the end of the motor shaft 21 and rotates along the motor shaft. The cutter disk 3 is connected to the upper side of the clutch 8.

An annular flange 32 extends upwardly from the outer perimeter of the cutter disk 3 and a bowl-shaped metal foil filter mesh 33 extends from the end of the flange 32. A plurality of filter holes 31 is defined in the flange 32 evenly and acts as outlets for the pulp of the fruits or vegetables being processed.

The collar 5 is set under the cutter disk 3 and can move up and down relying on a movement of the elevator assembly 6. Along with the movement, the distance between the collar 5 and the cutter disk 3 is adjusted, and a part of a filter hole 31 or a total of a filter hole 31 may be sealed by the collar 5, such that an amount of the pulp flying out from the filter hole 31 is adjustable, in other words, an amount of insoluble dietary fiber content in the pulp flying out from the filter hole 31 is controllable.

The elevator assembly 6 includes a deflector rod 61 with a first end protruding out the case 10 through the slot 11 and a second end rotatably connected to a post. A cap 615 is configured at the first end of the deflector rod 61 in order to facilitate operation. The deflector rod 61 defines a fixing hole 611 near its middle part. A hollow supporting shaft 612 extends upwardly from the deflector rod and is arranged between the fixing hole 611 and the cap 615. An elastic element 641 is received in the supporting shaft 612 and is configured for supporting a ball 613. In normal state, a part of the ball 613 protrudes out from an up-opening of the supporting shaft 612. When being pressed, the ball 613 can moves down alone the groove of the fixing bracket and is received in the supporting shaft 612 depending on the elastic recovery features of the elastic element 614. In the embodiment, the elastic element 614 is a spring.

The elevator assembly 6 further includes a first gear 62, a second gear 63, and a fixing bracket 64. A hollow column 641 protrudes upwardly from the upper surface of the fixing bracket 64, and the hole in the hollow column 641 runs through the fixing bracket 64, too. The fixing bracket 64 is sleeved on the motor shaft 21 via the hollow column 641 and is fixed to the motor assembly 2. The motor shaft 21 can rotate freely with respect to the fixing bracket 64. The hollow column 641 has external screw thread arranged at its outside wall. A groove 642 is defined in the lower surface of the fixing bracket 64. The ball 613 of the deflector rod 61 is partly received in the groove 642 and can move along the groove 642.

The second gear 63 is an external gear and meshes with the first gear 63. The second gear 63 has an internal screw thread which meshes with the external screw thread of the hollow column 641, and thus can move up and down with respect to the fixing bracket 64.

The first gear 62 is an external gear and meshes with the second gear 63. A post 621 extends downwardly from a lower surface of the first gear 62, and inserts in the fixing hole 611 of the deflector rod 61. The post 621 is near an edge of the first gear 62.

A bearing 7 is connected to the second gear 63 from the upper end of the second gear 63 and can rotate along the second gear 63.

The collar 5 is connected to the bearing 7 and can rotate freely with respect to the bearing 7. This can prevent the dangerous of the cutter disk 3 and the collar 5 to be locked deadly.

In operation, when the deflector rod 61 is moved from a first end of the slot 11 to a second end, the post 621 is pushed from a first position to a second position, and as a result the first gear 62 rotates. The second gear 63 rotates along the first gear 62 and moves upwardly (or downwardly in another embodiment) with respect to the hollow column 641. The bearing 7 and the collar 5 are lift upwardly by the second gear 63. As a result, the distance between the collar 5 and the cutter disk 3 is shorten, and the part of each filter hole 31 which is covered or sealed by the collar 5 is larger and larger. Thus a smaller amount of the pulp can fly out from the filter hole 31, in other words, the product has a smaller amount of insoluble dietary fiber content. All the filter hole 31 may be covered or sealed when the deflector rod 61 is moved to the second end of the slot 11, so we can obtain pure juice.

When the deflector rod 61 is moved from the second end of the slot 11 to the first end, the post 621 is pushed from the second position to the first position, and as a result the first gear 62 rotates. The second gear 63 rotates along the first gear 62 and moves downwardly with respect to the hollow column 641. The bearing 7 and the collar 5 are lowered by the second gear 63. As a result, the distance between the collar 5 and the cutter disk 3 becomes longer, and the filter holes 31 are opened gradually, and may wholly opened when the deflector rod 61 is positioned at the first end of the slot 11. Thus a greater amount of the pulp can fly out from the filter hole 31, in other words, the product has a greater amount of insoluble dietary fiber content.

The above description is only a preferable embodiment of the present invention. It should be noted that: for those skilled in this field, more modifications and improvements can be made on the premise of the technical principle of the present invention, which all shall be incorporated within the protective scope of the present invention.

What is claimed is:

1. A juicer, comprising:
   a base defining a slot in a side wall of the base;
   a motor assembly fixed in the base;
   a cutter disk connected to and driven by the motor assembly, a flange extending from an outer perimeter of the cutter disk and defining a plurality of filter holes which act as outlets for pulp of fruits and vegetables being processed, a metal foil filter mesh extending from an end of the flange;
   a collar configured under the flange; and
   an elevator assembly configured for lifting up or lowering down the collar in accordance with user's operations, as a result a distance between the collar and the cutter disk being adjusted and an area of each of the filter holes that being covered or sealed by the collar being adjusted.

2. The juicer according to claim 1, wherein the elevator assembly comprises:
   a deflector rod with a first end protruding out of the base through the slot and a second end locked in the base, the deflector rod defining a fixing hole near a middle part of the deflector rod, a supporting shaft extending upwardly from the deflector rod and arranged between the fixing hole and the first end;
   a first external gear comprising a post extending downwardly from a lower surface of the first external gear, the post inserting in the fixing hole of the deflector rod;

a fixing bracket fixed to the motor assembly, the fixing bracket comprising a column protruding upwardly from an upper surface of the fixing bracket and defining a groove in a lower surface of the fixing bracket, the column having external screw thread arranged at an outside wall of the column, the supporting shaft being partly received in the groove and capable of moving along the groove; and a second external gear engaging with the first external gear and comprising an internal screw thread which meshes with the external screw thread of the column.

3. The juicer according to claim 2, wherein the second external gear is hollow and has the internal screw thread in an inner side wall of the second external gear, the internal screw thread matches with the external screw thread, thus that the second external gear is capable of moving up and down with respect to the fixing bracket.

4. The juicer according to claim 3, wherein a cap is configured at the first end of the deflector rod in order to facilitate operation.

5. The juicer according to claim 4, wherein a bearing is connected to the second external gear from an upper end of the second external gear and can rotate along the second external gear, the collar is connected to the bearing and rotates freely with respect to the bearing.

6. The juicer according to claim 5, wherein the cutter disk is connected to the motor assembly via a clutch.

* * * * *